US012586474B2

(12) United States Patent
Martinez et al.

(10) Patent No.: US 12,586,474 B2
(45) Date of Patent: Mar. 24, 2026

(54) VISUAL DOCKING GUIDANCE SYSTEM

(71) Applicant: TK Airport Solutions, S.A., Mieres (ES)

(72) Inventors: Martin Martinez, Anderslöv (SE); Joachim Brink, Limhamn (SE); Frederik Petry, Hamburg (DE)

(73) Assignee: TK Airport Solutions, S.A., Mieres (ES)

( * ) Notice: Subject to any disclaimer, the term of this patent is extended or adjusted under 35 U.S.C. 154(b) by 63 days.

(21) Appl. No.: 18/708,441

(22) PCT Filed: Nov. 9, 2022

(86) PCT No.: PCT/EP2022/081311
§ 371 (c)(1),
(2) Date: May 8, 2024

(87) PCT Pub. No.: WO2023/083878
PCT Pub. Date: May 19, 2023

(65) Prior Publication Data

US 2025/0006068 A1 Jan. 2, 2025

(30) Foreign Application Priority Data

Nov. 9, 2021 (EP) .................................... 21207145

(51) Int. Cl.

| | |
|---|---|
| ***G08G 5/06*** | (2006.01) |
| ***G08G 5/00*** | (2025.01) |
| ***G08G 5/21*** | (2025.01) |
| ***G08G 5/26*** | (2025.01) |
| ***G08G 5/51*** | (2025.01) |

(52) U.S. Cl.
CPC ................. *G08G 5/51* (2025.01); *G08G 5/21* (2025.01); *G08G 5/26* (2025.01)

(58) Field of Classification Search
CPC .. G08G 5/21; G08G 5/26; G08G 5/80; G08G 5/22
See application file for complete search history.

(56) References Cited

U.S. PATENT DOCUMENTS

| | | | | |
|---|---|---|---|---|
| 2008/0231472 | A1* | 9/2008 | Hutton | B64F 1/3055 340/958 |
| 2013/0060457 | A1 | 3/2013 | Breuing | |
| 2017/0262732 | A1* | 9/2017 | Deng | G08G 5/51 |
| 2017/0263139 | A1* | 9/2017 | Deng | G06T 7/90 |

(Continued)

FOREIGN PATENT DOCUMENTS

| | | |
|---|---|---|
| CA | 958535 A | 12/1974 |
| EP | 0855065 B1 | 8/2003 |

(Continued)

*Primary Examiner* — Sisay Yacob
(74) *Attorney, Agent, or Firm* — Dinsmore & Shohl LLP

(57) ABSTRACT

Embodiments herein are directed to a visual docking guidance system configured to support an aircraft docking procedure where an approaching aircraft is docked at an airport stand. The VDGS is configured to detect the presence of the aircraft approaching the stand, identify at least the type of the approaching aircraft, determine a position of the approaching aircraft, output a visual guidance information via a display to the pilot of the aircraft, which supports the pilot during controlling movement of the aircraft to a stop position.

18 Claims, 5 Drawing Sheets

(56) References Cited

U.S. PATENT DOCUMENTS

| | | | |
|---|---|---|---|
| 2019/0106223 | A1 | 4/2019 | Håkansson |
| 2021/0070467 | A1 | 3/2021 | Berkmo |

FOREIGN PATENT DOCUMENTS

| | | | |
|---|---|---|---|
| EP | 2660152 | B1 | 9/2019 |
| WO | 200135327 | A1 | 5/2001 |
| WO | 2007108726 | A1 | 9/2007 |
| WO | 2020065093 | A1 | 4/2020 |

* cited by examiner b)

a)

VISUAL DOCKING GUIDANCE SYSTEM

CROSS-REFERENCE TO RELATED APPLICATIONS

This application is a U.S. national phase of International Application No. PCT/EP2022/081311, filed Nov. 9, 2022, which in turn claims priority to application EP 21 207 145.0, filed on Nov. 9, 2021, the contents of both are incorporated herein by reference in their entirety.

TECHNICAL FIELD

The present disclosure refers to a visual docking guidance system.

BACKGROUND

Conventionally visual docking guidance systems are disclosed in WO 2020/065093 A1, EP 2 660 152 B1 WO 2007/108726 A1 and WO 2001/035327 A1.

A visual docking guidance system provides visual guidance to the pilot of an approaching aircraft during parking the aircraft at an airport stand. Although the systems known today already provide good assistance to the pilot, there is still room for improvement. It is therefore an object of the present disclosure to provide an improved VDGS.

SUMMARY

The present disclosure refers to a Visual docking guidance system (VDGS) and a use of such a VDGS according to the main claims; embodiments are subject of the subclaims and the description.

In an embodiment of the present disclosure the VDGS is adapted to determine the type of the approaching aircraft via two independent determination methods. In case that both determination methods deliver two different aircraft types a warning signal is issued, in particular a stop signal is provided to the pilot of the approaching aircraft.

In particular in case the first determination method may be performed by analysing a signal broadcasted by the approaching aircraft. The signal may be a signal which is ongoing sent by the aircraft. In particular the signal is an ADS-B signal, containing information about the aircraft type.

The second determination method may be performed by optical scanning of the approaching aircraft, in particular by laser scanning. The scan result is analysed, in particular by comparing the scan result with prestored models related to several aircraft types. In case the scan result matches to the aircraft type determined by analysing the signal, the aircraft type of the approaching aircraft is validated and aircraft type information can be used for further guidance.

Laser scanning can be performed by one or more lidars. A lidar may be placed at a VDGS main housing or outside and/or remote to the VDGS main housing. The lidar scans the apron are and in particular generates a point cloud of points on the aircraft fuselage as a scan result.

A computer of the VDGS may process the obtained scan result and calculate the azimuth, stopping distance, aircraft speed etc. This information is sent to the display to be shown to the pilots.

The data obtained from the lidar by scanning may be used detect obstacles on the apron.

The VDGS includes a display unit, for example placed in a manner so that it is clearly visible to pilots of the approaching aircraft.

When in a conventional VDGS a STOP signal is shown, it is often too late or the pilot needs to perform a hard brake. Conventionally, there is a fixed allowed maximum speed within a zone near of the parking position and suddenly, the system shows "STOP". Therefore, in an embodiment of the present disclosure the speed of the aircraft is tracked during aircraft approaching the stand. The target speed and/or maximum allowed speed is depending on the distance.

The relation between the actual speed, target speed and tolerated excess speed may eb visualized on the screen by colour or by numbers (e.g. by showing "SLOW DOWN").

Consequently, in an embodiment, the VDGS is adapted to provide an information, such as a stop signal, in case a speed of the approaching aircraft exceeds a maximum allowed speed. Here the maximum allowed speed is dependent on the distance of the aircraft from the stop position.

As such, the maximum allowed speed is decreasing with the distance of the aircraft from the stop position is decreasing. In other words: the maximum allowed aircraft speed gets smaller the more the aircraft approaches the stop position.

Conventionally, a VDGS may have the problem that the text on the display is often hard to read for pilots when far out.

In an embodiment, the present disclosure solves this problem by making the font size dependent of the distance to the stop position. As the aircraft is approaching the font gets smaller and more information can be displayed at once.

In an embodiment, the VDGS may be adapted to provide visual information in the display in a manner, that in a first docking situation an information is visually displayed on the display in a first font size, and that during the first docking situation the aircraft has a first distance to the stop position. In a second docking situation the same or similar information is visually displayed on the display in a second font size, wherein during the second docking situation the aircraft has a second distance to the stop position.

Here the first distance to the stop position is larger than the second distance to the stop position, and the first font size is larger than the second font size.

Some conventional VDGS are not able to guide aircraft reliably on curved lead in lines, because the nose of the aircraft is not sufficiently visible at all times. The present disclosure solves this this problem with intelligent curve guidance technology.

By matching the aircraft model with the point cloud, the position of the aircraft is known in particular at all time during approaching of the aircraft (also if only other parts than the nose of the aircraft can be seen by the scanner). Also, the distance between the front and rear wheel is known as the aircraft type is known.

With the scan result comprising at least X, Y, Z coordinates points on the aircraft fuselage the VDGS is in particular able to locate an aircraft position and orientation (pitch, roll, yaw) in real-time.

In an embodiment the VDGS provides curve guidance depending on the aircraft type. In most stands on airports there is a curved turn in lead in line to help pilots "overturns" so that the aircraft will end up straight. The problem with this is that all aircraft models have different turn radius. This is why bigger aircraft is making bigger overturns than the painted line proposes. Since, according the present disclosure, the aircraft type is known by the VDGS, the VDGS can provide type individual curve guidance.

In an embodiment, the VDGS is adapted to provide type-individual curve guidance. For example, the aircraft type is determined and based on the determined aircraft type a recommended type-individual path for driving through a curve is determined. The latter determination can be done by consulting a database in which a relation between the aircraft type and the related type-individual path is stored. A visual guidance to the pilot is provided in dependency on the determined type-individual path.

BRIEF DESCRIPTION OF THE DRAWINGS

The present disclosure is exemplarily described in more detail with reference to the below figure description, herein show.

DETAILED DESCRIPTION

Figure 1:
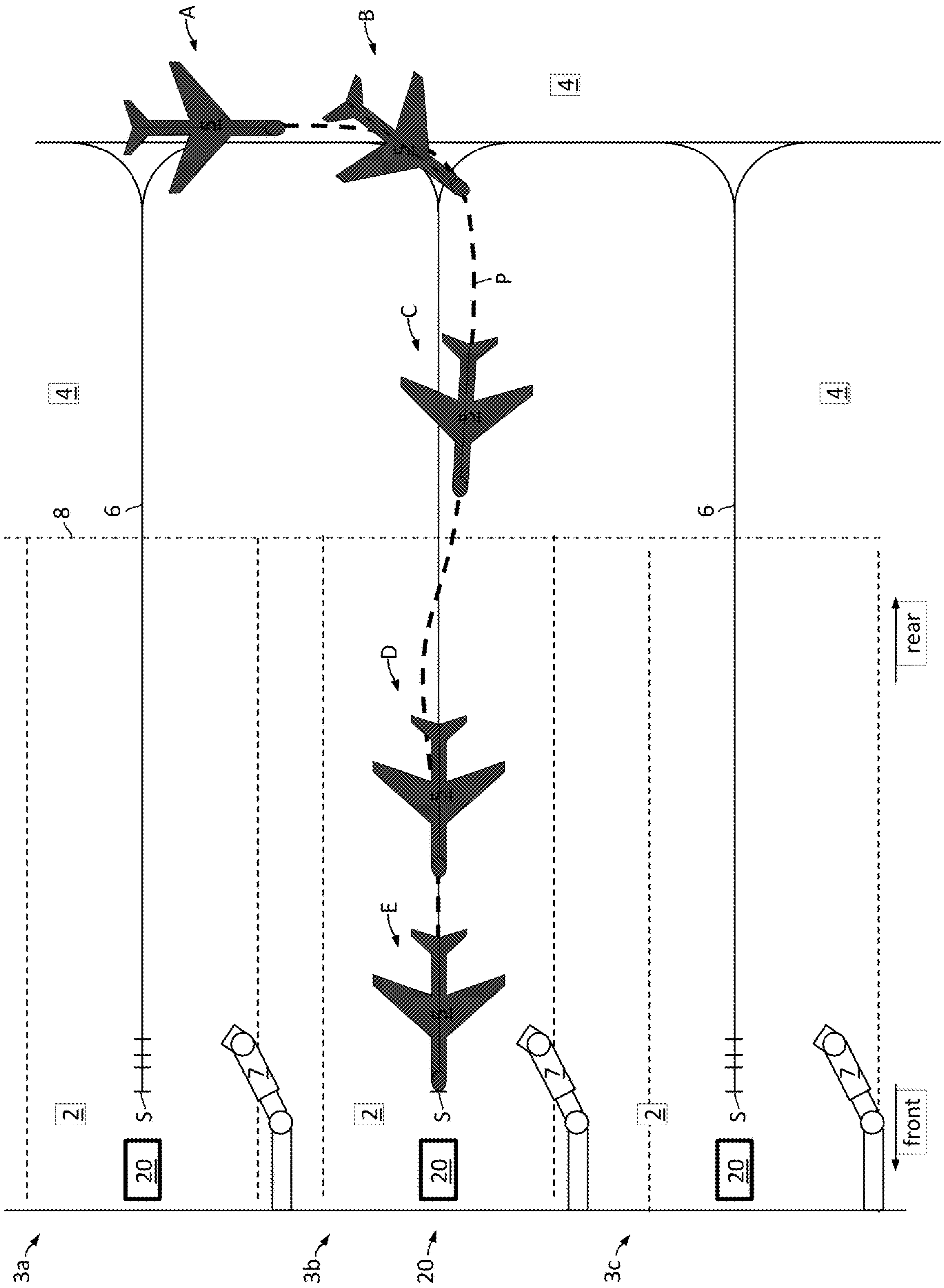
FIG. 1 schematically depicts an aircraft approaching an airport stand during the illustrative method according to one or more embodiments shown and described herein.

FIG. 1 shows an apron area of an airport. The airport has a plurality of gates 3, each having a respective stand 2 on which an aircraft 5 can be parked. A passenger boarding bridge 7 is provided, through which passengers can enter or leave the aircraft 5. On the apron ground there is painted a lead in line 6, along which a front wheel of the aircraft 5 is guided when approaching from a taxiway 4. A VGDS (Visual docking guidance system) 20 is provided to support the pilot controlling the aircraft 5 while driving the aircraft 5 to a stop position S. Several stop positions S are painted on the apron ground at lead in line 6, indicating the position where a part of the front end of the aircraft (in most cases the front wheel) should be aligned with during parking.

It is to be understood that a gate can include more than one passenger boarding bridge 7, more than one lead-in-line 6 and/or more than one VDGS 20.

The VDGS 20 includes a display 22, on which information can be displayed to the pilot. In the following figures, the display 22 is selectively inserted and shows isolated the information presented on the display in the respective context.

During docking of the aircraft, several phases of docking A to E are performed. In FIG. 1, each phase is illustrated by an aircraft, marked by an arrow A to E, where the arrows indicate the phase of docking A to E. The phases are described below.

In a first phase A, the aircraft 5 is detected by the VDGS (visual docking guidance system) 20. Here the VDGS 6 may have received data relating an approaching aircraft via a flight database (not shown). The first phase may include a detection step and identification step. For more details regarding detecting and identifying an approaching aircraft 5 reference is made to the below description of FIG. 2.

In a second phase B the aircraft 5 is further approaching the stand 2, thereby performing curve movement.

Generally, during a curve movement, the curve may have an angle of more than 45°.

During a curve movement, the VDGS provides guidance to the pilot of the aircraft. For more details regarding the curve movement reference is made to the below description of FIG. 3.

In a third phase C, the pilot of the approaching aircraft can correct the orientation relative to the lead in line 6. Here, the front wheel needs to be as soon as possible to be aligned with the lead in line 6 so that also the in the further movement of the aircraft the rear wheels get also centred with the lead in line 6.

Figure 4:
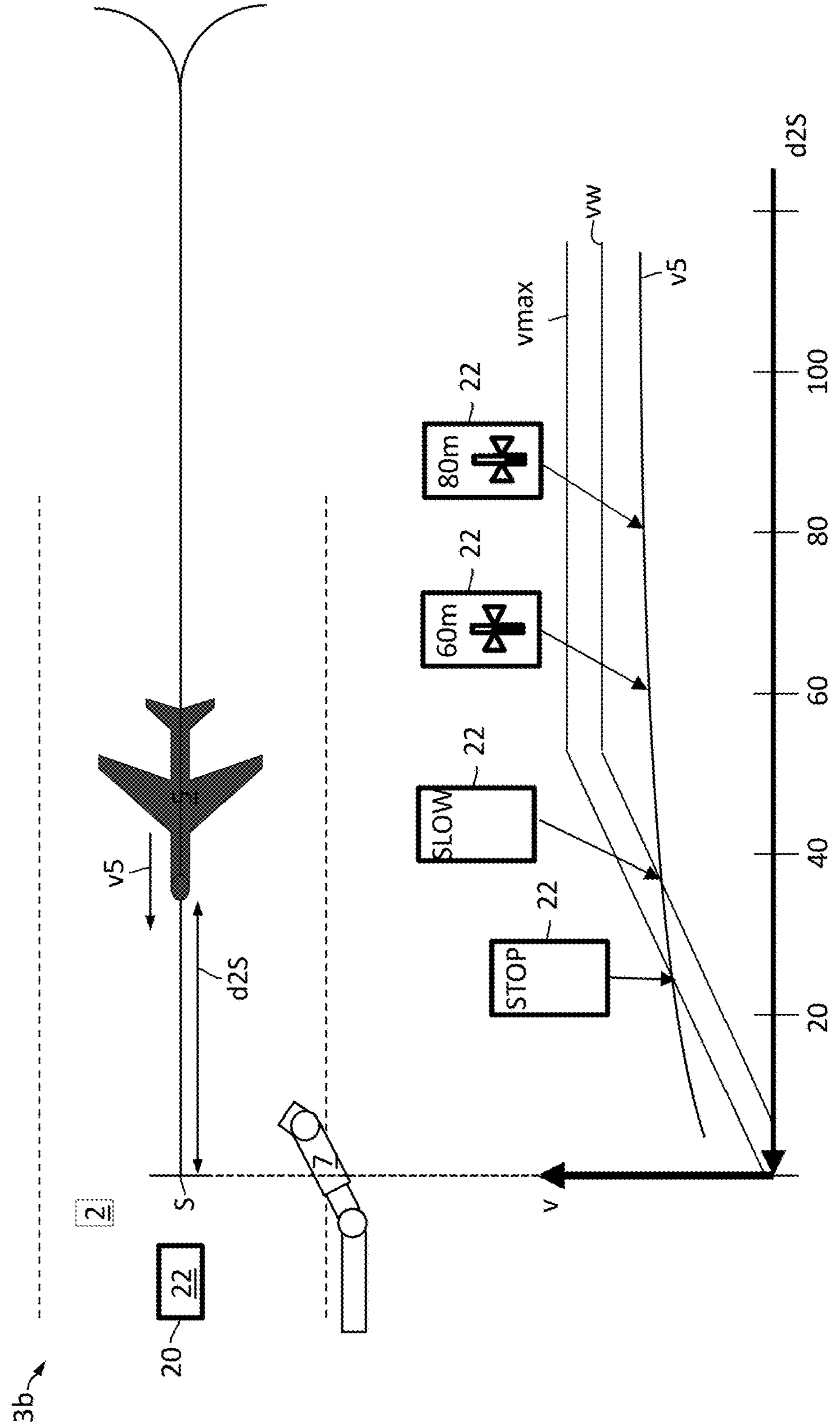
FIG. 4 schematically depicts the approaching aircraft during speed reduction supported by the VDGS according to one or more embodiments shown and described herein.

In a fourth phase D, the aircraft 5 is aligned with the lead in line 6 and a distance to the stop position is getting smaller, so that the aircraft speed needs particular attention. Reference is made to FIG. 4.

In a fifth phase E, the aircraft 5 is stopped at the stop position S.

Figure 2:
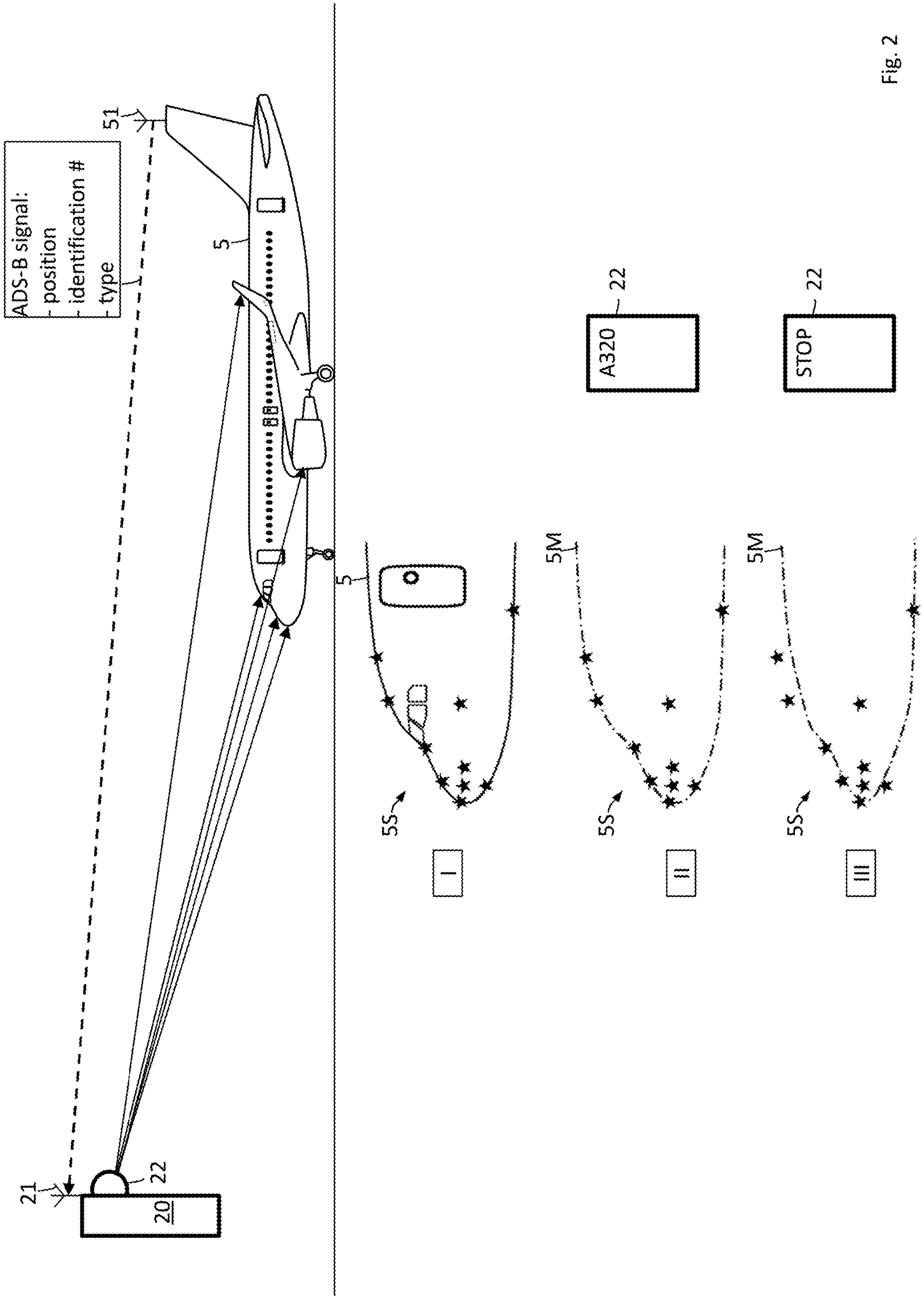
FIG. 2 schematically depicts the approaching aircraft during detecting and identifying by a VDGS, according to one or more embodiments shown and described herein.

FIG. 2 shows more details of the detection and identification steps.

The approaching aircraft 5 permanently broadcasts an ADS-B signal via an aircraft antenna 51, which is received by a VDGS antenna 21 (the VDGS antenna 21 may be located anywhere on the airport, not necessarily located at a main housing of the VDGS). The ADS-B signal contains position data indicating the position of the sending aircraft and ID data relating to the identity of the sending aircraft and the type of aircraft.

The VDGS 20 receives a plurality of ADS-B signal from a plurality of aircrafts, so the VDGS needs to filter the plurality of ADS-B signals to the approaching aircraft located at the respective stand. By comparing the position date of the ADS-B signal with the known position of the stand 2 the relevant ADS-B signal can be selected. From the selected ADS-B signal the VDGS 20 can determine the aircraft type of the approaching aircraft 5. For more details reference is made to EP 2 660 152 B1. From the ADS-B signal the VDGS can determine that in this example the type of the approaching aircraft is a A320.

At the same time the VDGS scans the stand 2 via a laser scanner 22 to optically detect the approaching aircraft 5. Reference is made to WO 2020/065093 A1.

Section I in FIG. 2 shows a scan 5S of the approaching aircraft obtained by laser scanning. The scan result is here a point cloud 5S representing a surface portion of the approaching aircraft, illustrated by a plurality of stars.

Section II in FIG. 2 illustrates a comparison of the scan result 5S with a digital model 5M of a first aircraft type, here the surface model of e.g. an A320. The scan 5S matches with the model 5M. So the scan result validates the above detection of the aircraft type via ADS-B. On the display 22 the validated aircraft type A320 is shown.

Merely for reference section III in FIG. 2 shows exemplarily a model 5M of a B737. Here the scan result 5S does not match to the model 5M. Consequently, it cannot be validated by scanning, that the approaching aircraft is a B737.

In case that both determination methods do not lead to the determination of an identical aircraft type, a failure signal is issued. This may lead to issuance of a STOP signal on the VDGS display 22, requesting the pilot of the approaching aircraft to stop immediately.

Said above way of validating the aircraft type serves also for treating with bad weather conditions. As long as the VDGS is able to determine the aircraft type via laser scanning, the visibility conditions are sufficient for supporting docking by laser scanning. As, such, there is no explicit weather condition monitoring process necessary.

In sum, scanning the aircraft and determining the aircraft type via ADS-B lead both the same result that the aircraft type in an A320. So the aircraft type is detected by two independent detecting methods.

The above steps of determination can be repeated also in the following phases.

Figure 3:
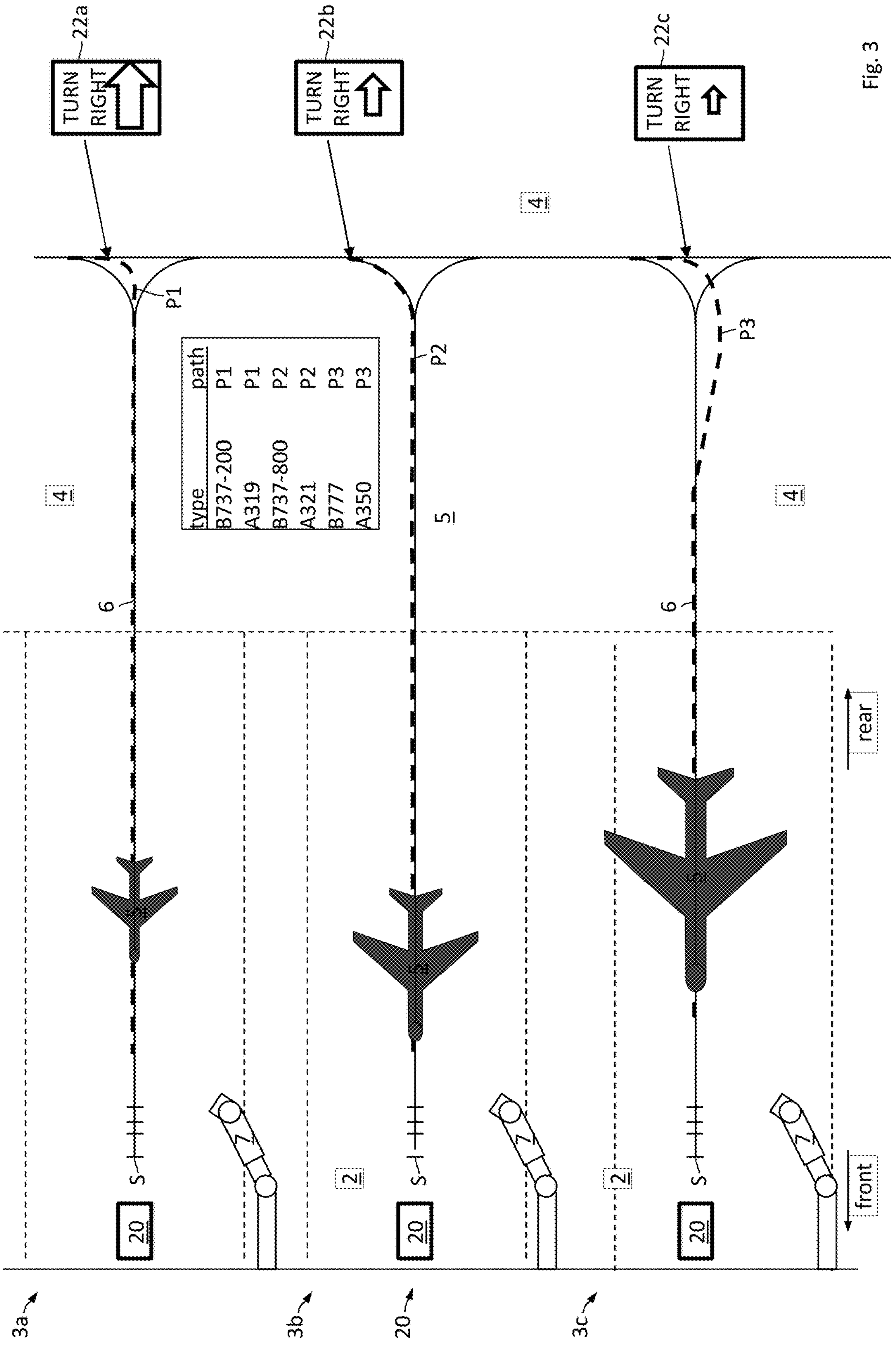
FIG. 3 schematically depicts different approaching aircrafts guided by the VDGS in a different manner according to one or more embodiments shown and described herein.

FIG. 3 shows details of the curve movement and curve movement. As an example, in the three stands shown in FIG. 3 different aircraft types are approaching the aircraft. In the stand 3*a* a smaller aircraft (e.g. a A319), in the stand 3*b* a medium sized aircraft (e.g. a A321) and in the stand 3*c* a larger aircraft (e.g. a A350) are approaching. For each approaching situation, a recommended path P is shown which in a curved section may deviate from the painted lead in line 6. Depending on geometrical conditions of the aircraft the front wheel ideally takes an individual path P to get also the rear wheels as fast as possible centred with the following straight lead in line 6 within the stand.

The table in the right area of FIG. 3 is an allocation table between different aircraft types and the optimum path P for the front wheel which should be the basis for guiding the aircraft in the curve.

Depending on the individual path, the VDGS provides type-individual curve guidance for each aircraft type.

As an example this type-individual guidance may have two aspects as illustrated in FIG. 3.

In a first aspect, an individual turn radius is illustrated, which conforms to the turn radius of the path P. So a larger turn radius is illustrated with a smaller arrow (see display 22*c*); a smaller turn radius is illustrated with a bigger arrow (see display 22*a*). There are plenty of other possibilities to visually indicate the size of the radius, in particular by using a certain colour for a certain radius.

In a second aspect an arrow is displayed as soon as the aircraft, in particular the front wheel, has reached the curve in the path P. So in the docking situation of stand 3*b* the turning command in display 22B is displayed earlier than in the docking situation of Stand 3*c*.

During curve movement the position and angle orientation of the aircraft is permanently monitored. In case the aircraft does not follow the proposed path, the arrow shown in the display 22 may be enlarged or may be blinking, which is a hint to the pilot to increase the steering angle. There are several other possibilities available.

FIG. 4 shows the approaching aircraft in the fourth phase. Here the pilot is controlling the speed in a manner that the aircraft gets well aligned with the stop position in a short time. In case the aircraft is driving too fast a stop signal is issued by the VDGS and presented on the display 22.

In the lower area of FIG. 4 a correlation diagram is shown between the maximum allowed speed vmax and the distance to the stop position d2S.

In case the actual speed v5 of the aircraft 5 is not greater than the allowed speed vmax, the VDGS as usual provides guidance information. As soon as the speed is higher than the allowed speed vmax, the VDGS issues a stop signal which is presented on the display 22.

In an optional embodiment, below the maximum allowed speed a warning speed vw is provided. In case the actual speed v5 reaches the warning area vw a warning signal ▯SLOW DOWN▯ is issued, indicating the pilot to immediately reduce the speed.

This allows a desirable docking within a short time. Advantageously it takes into account that high speeds at a higher distance to the stop position are of minor risk than high speeds short before the stop position. This reduces the risk for an unnecessary STOP signal when the aircraft 5 is still far away from the stop position.

With the distance to the stop position d2S is decreasing also the allowed maximum speed vmax is decreasing.

In the optional embodiment also the warning speed vw is depending on the distance to the stop position d2S in a similar manner.

Figure 5:
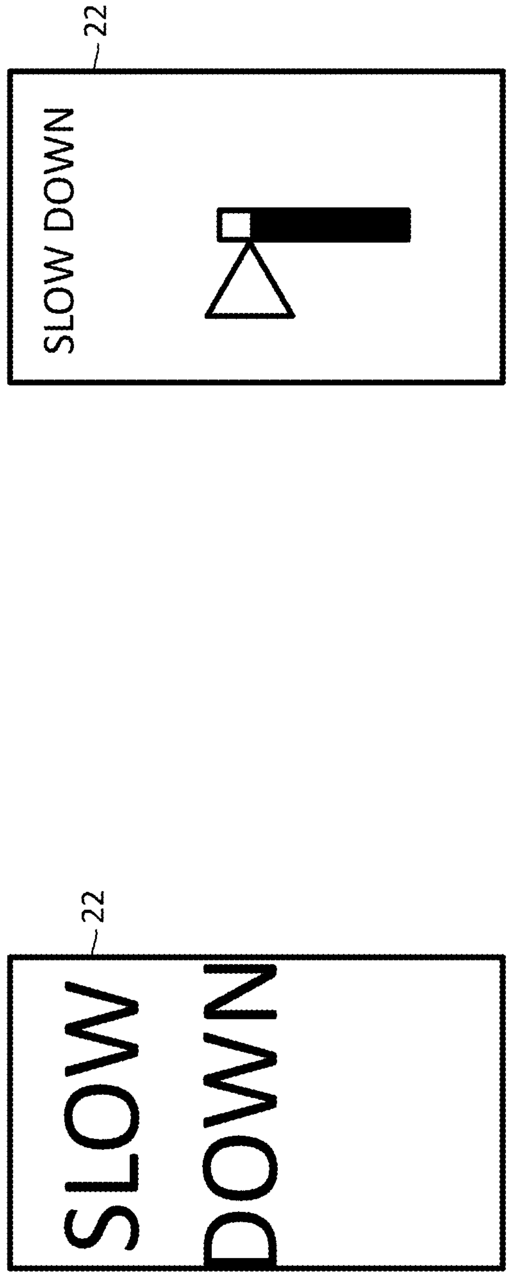
FIG. 5*a* schematically depicts a display shown on a VDGS display of a first aspect slow down signal depending on the distance of the aircraft to the stop position according to one or more embodiments shown and described herein.
FIG. 5*b* schematically depicts another display shown on the VDGS display of a second aspect slow down signal depending on the distance of the aircraft to the stop position according to one or more embodiments shown and described herein.

FIG. 5*a* shows the display 22 of the VDGS 20. On the display there is shown a slow down signal, because the aircraft speed is too high but still below the maximum allowed speed vmax. The distance to stop position d2S of the aircraft 5 is large, so a larger font is used.

FIG. 5*b* shows the display 22 of the VDGS 20. On the display there is also shown a slow down signal, because the aircraft speed is too high but still below the maximum allowed speed vmax. The distance to stop position d2S of the aircraft 5 is small, so a smaller font is used, compared to FIG. 5*a*. Consequently, there is more space left on the display 22 to provide additional information, e.g. a guidance information that the aircraft should move more rightwards.

The invention claimed is:

1. A visual docking guidance system (VDGS) configured to support an aircraft docking procedure where an approaching aircraft is docked at an airport stand, the VDGS comprising:

a computer configured to:

detect the presence of the aircraft approaching the stand, identify at least the type of the approaching aircraft, determine a position of the approaching aircraft, output a visual guidance information via a display to the pilot of the aircraft, which supports the pilot during controlling movement of the aircraft to a stop position, wherein the VDGS is configured to provide type-individual curve guidance.

2. The visual docking guidance system according to claim 1, wherein the computer is further configured to:

determine the type of the approaching aircraft via two independent determination methods, and in case both determination methods deliver two different aircraft types, a warning signal is issued to the pilot of the approaching aircraft.

3. The visual docking guidance system according to claim 2, wherein:

the first determination method is performed by analyzing a signal broadcasted by the approaching aircraft, the second determination method is performed by optical scanning of the approaching aircraft and analyzing the respective scan result by comparing the scan result with prestored models related to several aircraft types.

4. The visual docking guidance system according to claim 1, wherein during the providing of the type-individual curve guidance, the computer is further configured to:

determine the aircraft type, based on the determined aircraft type, a recommended type-individual path for driving through a curve is determined, and a visual guidance to the pilot is provided in dependency on the determined type-individual path.

5. The visual docking guidance system according to claim 1, wherein the computer is further configured to:

provide an information, in case a speed of the aircraft exceeds a maximum allowed speed, wherein the maximum allowed speed is dependent on the distance of the aircraft from the stop position.

6. The visual docking guidance system according to claim 5, wherein the maximum allowed speed is decreasing with the distance of the aircraft from the stop position is decreasing.

7. The visual docking guidance system according to claim 1, wherein the computer is further configured to:

provide visual information in the display in a manner, that in a first docking situation an information is visually displayed on the display in a first font size, that during the first docking situation the aircraft has a first distance to the stop position, that in a second docking situation the same or similar information is visually displayed on the display in a second font size, that during the second docking situation the aircraft has a second distance to the stop position, that the first distance to the stop position is larger than the second distance to the stop position, and that the first font size is larger than the second font size.

8. The visual docking guidance system according to claim 1 wherein the visual guidance information output by the display provides visual guidance to the pilots of an approaching aircraft during parking of the aircraft.

9. The visual docking guidance system according to claim 2, wherein the warning signal is a stop signal provided to the pilot of the approaching aircraft.

10. The visual docking guidance system according to claim 5, wherein the information is a stop signal.

11. A method configured to support an aircraft docking procedure where an approaching aircraft is docked at an airport stand, the method comprising:

detecting the presence of the aircraft approaching the stand;

identifying at least the type of the approaching aircraft;

determining a position of the approaching aircraft;

providing type-individual curve guidance; and outputting a visual guidance information via a display to the pilot of the aircraft, supports the pilot during controlling movement of the aircraft to a stop position.

12. The method according to claim 11, further comprising:

determining the type of the approaching aircraft via two independent determination methods, and in case both determination methods deliver two different aircraft types, a warning signal is issued to the pilot of the approaching aircraft.

13. The method according to claim 12, wherein:

the first determination method is performed by analyzing a signal broadcasted by the approaching aircraft; and the second determination method is performed by optical scanning of the approaching aircraft and analyzing the respective scan result by comparing the scan result with prestored models related to several aircraft types.

14. The method according to claim 11, wherein during the providing of the type-individual curve guidance, the method further comprising:

determining the aircraft type;

determining, based on the determined aircraft type, a type-individual path for driving through a curve; and providing-a visual guidance to the pilot is provided in dependency on the determined type-individual path.

15. The method according to claim 11 further comprising:

providing an information, in case a speed of the aircraft exceeds a maximum allowed speed, wherein the maximum allowed speed is dependent on a distance of the aircraft from the stop position.

16. The method according to claim 15, wherein the maximum allowed speed is decreasing with the distance of the aircraft from the stop position is decreasing.

17. The method according to claim 10, further comprising:

providing visual information in the display in a manner, that in a first docking situation an information is visually displayed on the display in a first font size;

that during the first docking situation the aircraft has a first distance to the stop position;

that in a second docking situation the same or similar information is visually displayed on the display in a second font size;

that during the second docking situation the aircraft has a second distance to the stop position;

that the first distance to the stop position is larger than the second distance to the stop position; and that the first font size is larger than the second font size.

18. The method according to claim 11, further comprising:

outputting by the display provides visual guidance to the pilots of an approaching aircraft during parking of the aircraft.

* * * * *